United States Patent [19]

Iyehara et al.

[11] Patent Number: 4,571,614

[45] Date of Patent: Feb. 18, 1986

[54] COLOR IMAGE DISPLAY APPARATUS

[75] Inventors: Sadahiro Iyehara, Suita; Shizuo Inohara, Toyonaka; Mitsuya Masuda; Minoru Ueda, both of Takatsuki; Keisuke Yamamoto, Ibaraki, all of Japan

[73] Assignee: Matsushita Electric Industrial Co., Ltd., Kadoma, Japan

[21] Appl. No.: 495,433

[22] Filed: May 17, 1983

[30] Foreign Application Priority Data

May 19, 1982 [JP] Japan .................................. 57-85136
Apr. 30, 1983 [JP] Japan .................................. 58-77028

[51] Int. Cl.$^4$ ............................................. H04N 5/66
[52] U.S. Cl. ...................................... 358/56; 358/230
[58] Field of Search ...................... 358/56, 230, 59, 64, 358/65, 11, 12, 13, 21 R, 23, 40

[56] References Cited

U.S. PATENT DOCUMENTS

| 4,158,210 | 6/1979 | Watanabe et al. | 358/56 |
| 4,449,148 | 5/1984 | Inohara | 358/56 |
| 4,451,846 | 5/1984 | Iyehara | 358/56 |
| 4,451,852 | 5/1984 | Masuda | 358/56 |

FOREIGN PATENT DOCUMENTS 0025999 4/1981 European Pat. Off. .
57-135590 8/1982 Japan .

Primary Examiner—Michael A. Masinick
Attorney, Agent, or Firm—Cushman, Darby & Cushman

[57] ABSTRACT

A flat CRT type color image display apparatus comprises a number of horizontally disposed parallel line cathodes, vertical and horizontal deflection means and electron beams control means, wherein a clock pulse signal is produced by frequency-multiplying a pulse signal which is synchronized with color sub-carrier of the color TV signal, chrominance signal is A/D converted using the clock signal, therewith producing a PWM signal with which electron beams are controlled.

5 Claims, 10 Drawing Figures

COLOR IMAGE DISPLAY APPARATUS

BACKGROUND OF THE INVENTION

1. Field of the Invention

The present invention relates to a color image display apparatus comprising a flat displaying apparatus with a number of (for example fifteen) line cathodes.

More particularly, the present invention relates to a color image display apparatus for displaying color image by means of a phosphor screen and a plural number of parallel disposed line cathodes wherein pulse width modulation is used to control electron beams.

2Description of the Prior Art

Hitherto, for an image display apparatus for a television set, a cathode-ray tube having a single electron gun, or three electron guns set in a neck part of a bulky cone shaped vacuum enclosure, has been used for long time. The shortcoming of the conventional cathode ray tube is a large depth in comparison with the size of the screen face, preventing the manufacture of a flat and compact television set. Though EL display apparatus, plasma display apparatus or liquid crystal display apparatus has been developed, these are not sufficiently usable for practical use because they have problems in brightness, contrast or color displaying.

As a novel flat type image display apparatus using electron beams, the applicant has proposed an invention in a senior Japanese Pat. Application Sho 56-20618 (published in the Japanese un-examined Pat. Application Sho 57-135590 which was published only after the priority date of the present case). This senior Japanese application serves as one priority document for Lyehara et al. U.S. Pat. No. 4,451,846. The art of the senior application is a color display apparatus comprising:

a color phosphor screen comprising a first predetermined number of horizontally divided sections each comprising a set of regions of primary color phosphors disposed in horizontal direction, electron beam source means for in-turn emitting a second predetermined number of horizontal rows of electron beams, each row having the first predetermined number of electron beams, producing one horizontal line on the color screen, horizontal deflection means for selective impingements of the electron beams on the regions in turn selected corresponding kinds of primary color phosphors at one time, in turn changing colors of the horizontally divided sections, vertical deflection means for vertically deflecting the electron beams in such a manner that electron beams of a horizontal row impinges the phosphor screen in one vertically divided segment which is corresponding to the one horizontal row, thereby vertically moving the one horizontal line in the vertically divided segment, electron beam control means for simultaneous controlling of intensities of respective electron beams responding to color video signal for the selected kind of primary color to produce a line-at-a-time displaying of color video picture, and a flat shaped vacuum enclosure containing the above-mentioned components therein, one end face thereof forming a screen face in which the color phosphor screen is provided.

The line-at-a-time type displaying is suitable for display apparatus of the flat type CRT, liquid crystal panel, EL panel, LED panel, plasma panel or the like flat type display apparatus. Such line-at-a-time type image display apparatus generally displays an image by storing video signal information for a period of one horizontal scanning line and reading out the stored data for that one line at a time in the immediately subsequent horizontal fly-back period.

One preferred inventors' prior art apparatus is shown in FIG. 1, wherein from the back part to front part the following components are provided in a flat box-shaped enclosure.

Incorporate herein by reference the U.S. Pat. No. 4,451,846 to Iyehara et al, issued May 29, 1984, column 2, line 32 through column 8 line 35 thereof and column 8 lines 48 through 64 thereof.

However, the above-mentioned inventors' prior art apparatus has the following technical problem. A first problem is that depending on dispersions of capacitances of capacitors used as analog memory in the sample hold circuits $31_1$, $31_2$..., the output levels disperse. A second problem is that the sampling clock are not necessarily stable. Unless the stability is improved by, for instance, utilizing PLL circuit, the unstability factor of the clock signal results in horizontal non-lineality of the deflection, if there is expansion and contraction of the displayed image or low color impurity due to inaccurate impingement by electron beams on partly erroneous color phosphors. However an independent stable PLL circuit is constituted, the cost of the circuit becomes very much expensive since a quartz oscillator of a very high stability is necessary as the reference oscillator. Therefore, the present invention proposes more economical and sufficiently stable circuit.

SUMMARY OF THE INVENTION

The present invention is intended to provide a television set or the like appliance with a flat shaped display apparatus of the line-at-a-time displaying type.

The present invention enables display of a high quality color image with accurate chrominance control.

The present invention utilizes digital memory means as memory means to store data of video information for one horizontal scanning period, having very high accuracy without dispersion effect on the displayed image, and by utilizing pulse width modulation in electron beam control a very high quality image display is obtainable. Furthermore, clock pulses for use in the A/D converter and pulse width modulator are produced by utilizing frequency multiplication of the color sub-carrier, thereby dispensing with and expensive reference oscillator.

DESCRIPTION OF THE PREFERRED EMBODIMENTS

A color image display apparatus in accordance with the present invention may comprise:

clock signal generator means for generating a clock signal having a frequency of an integer-times-multiplication of a color sub-carrier of a color television signal, the clock signal being synchronized to the color sub-carrier, A/D conversion means for converting composite signal of the color television signal into digital primary color signals by utilizing the clock signal, memory means for storing the digital primary color signals until the end of the next horizontal scanning period, PWM means for converting the digital primary color signals read out from the memory means into pulse-width modulated primary color signals, and color image display means for displaying color image by utilizing the pulse-width modulated primary color signals.

Figure 1:
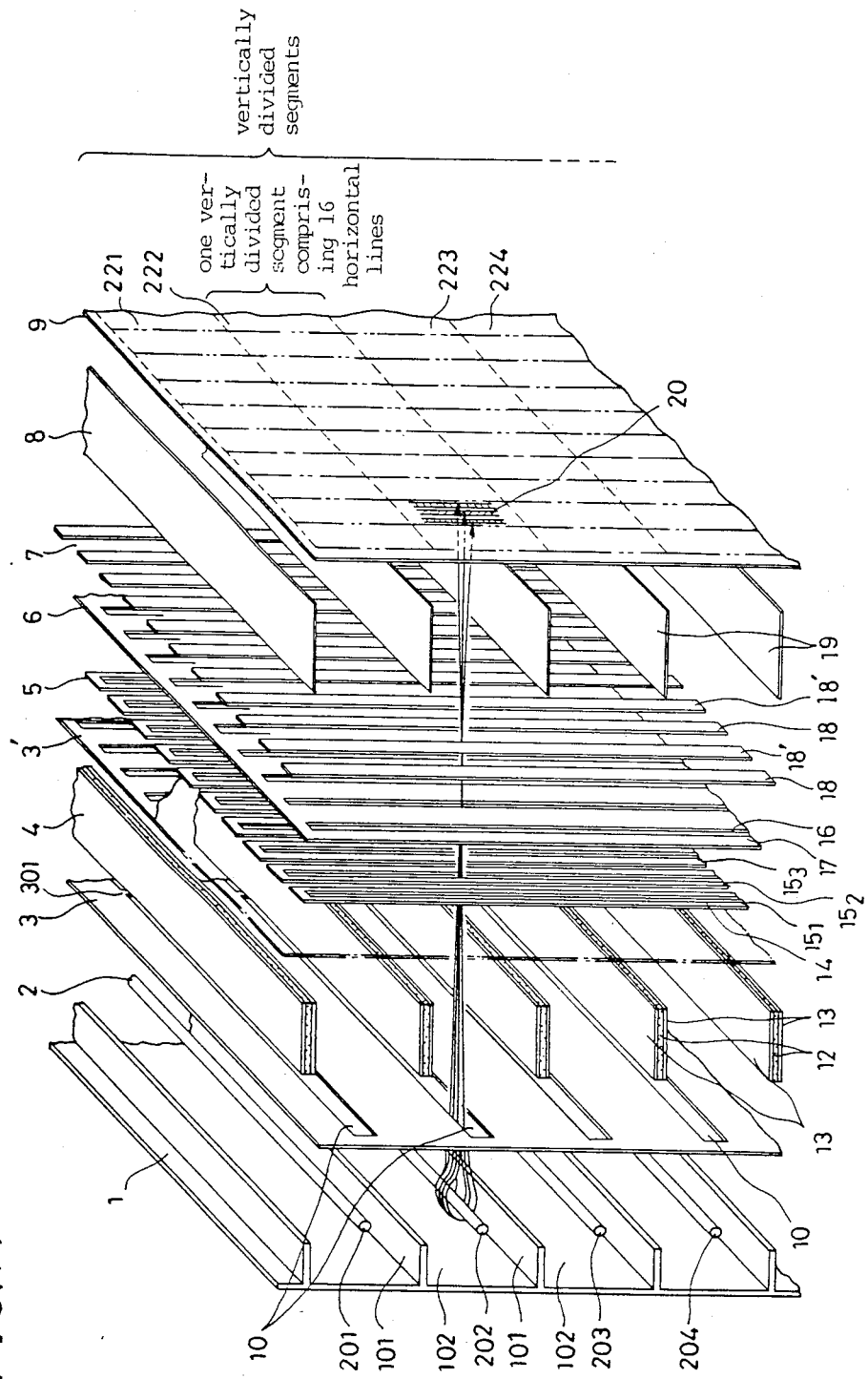
FIG. 1 is an exploded perspective view of a principal part, with its vacuum enclosure removed, of a video image display apparatus to embody the present invention, expanded in size in its horizontal direction in comparison with its vertical direction for easier illustration of minute details.
Figure 2:
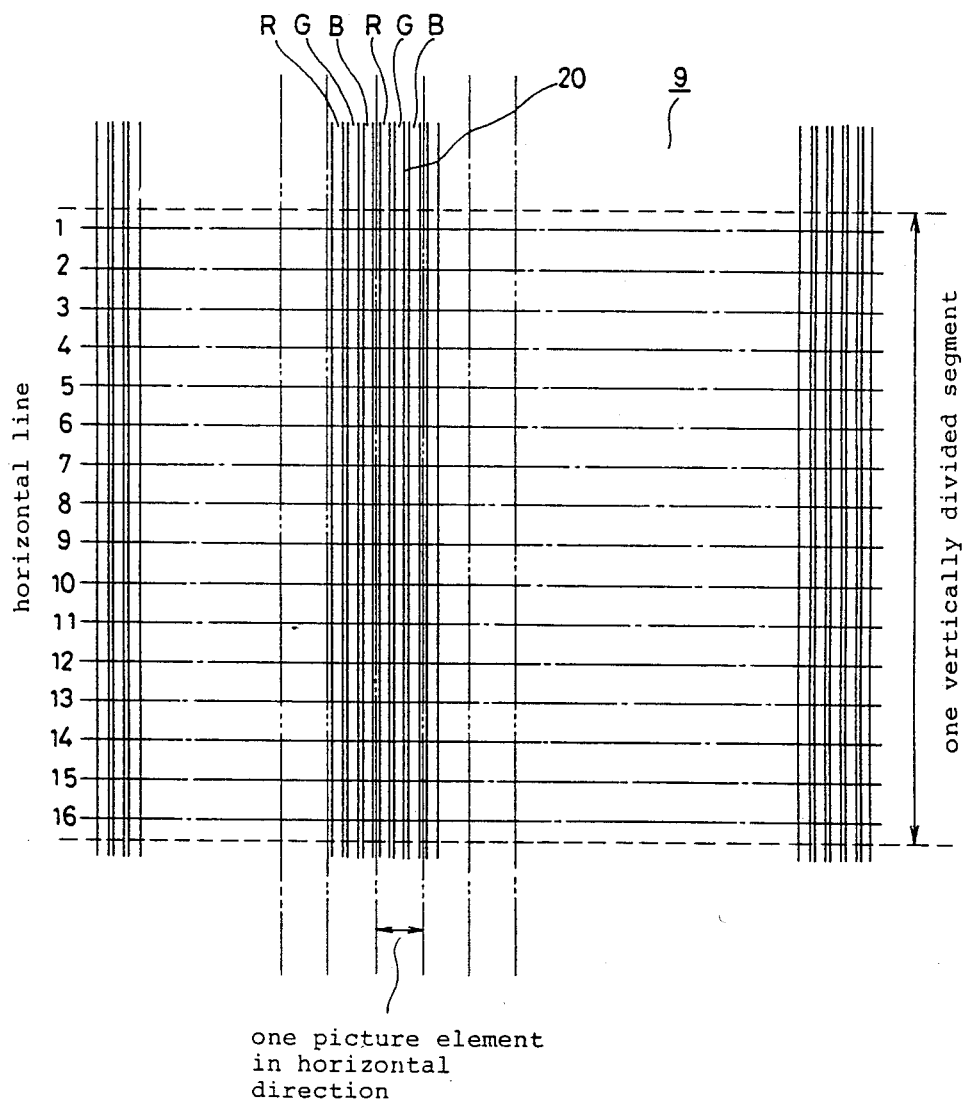
FIG. 2 is a schematic front view of a phosphor screen of the apparatus of FIG. 1.
Figure 3:
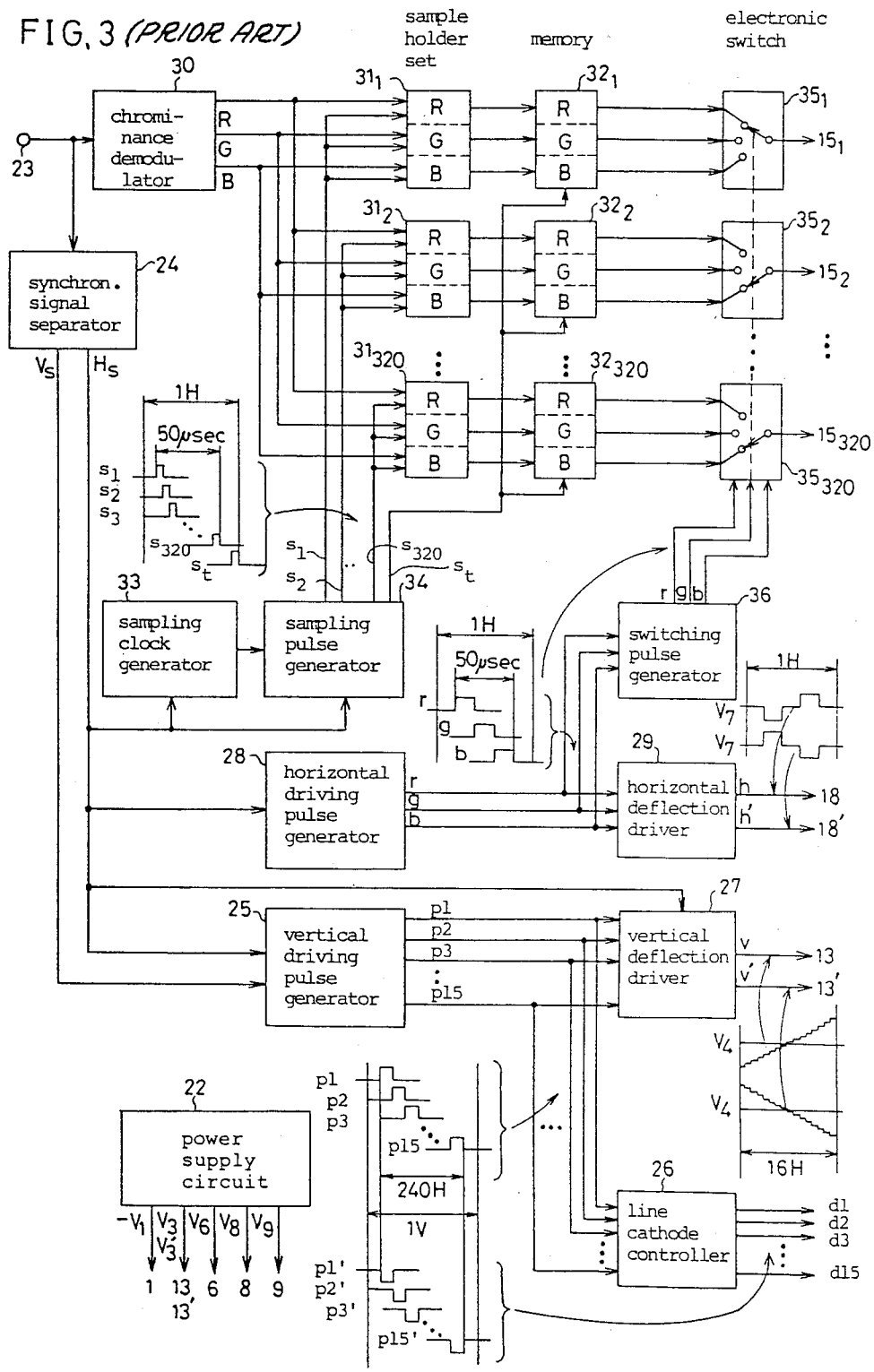
FIG. 3 is a circuit block diagram showing an inventors' prior art of electric circuit configuration to operate the apparatus of FIG. 1.
Figure 4:
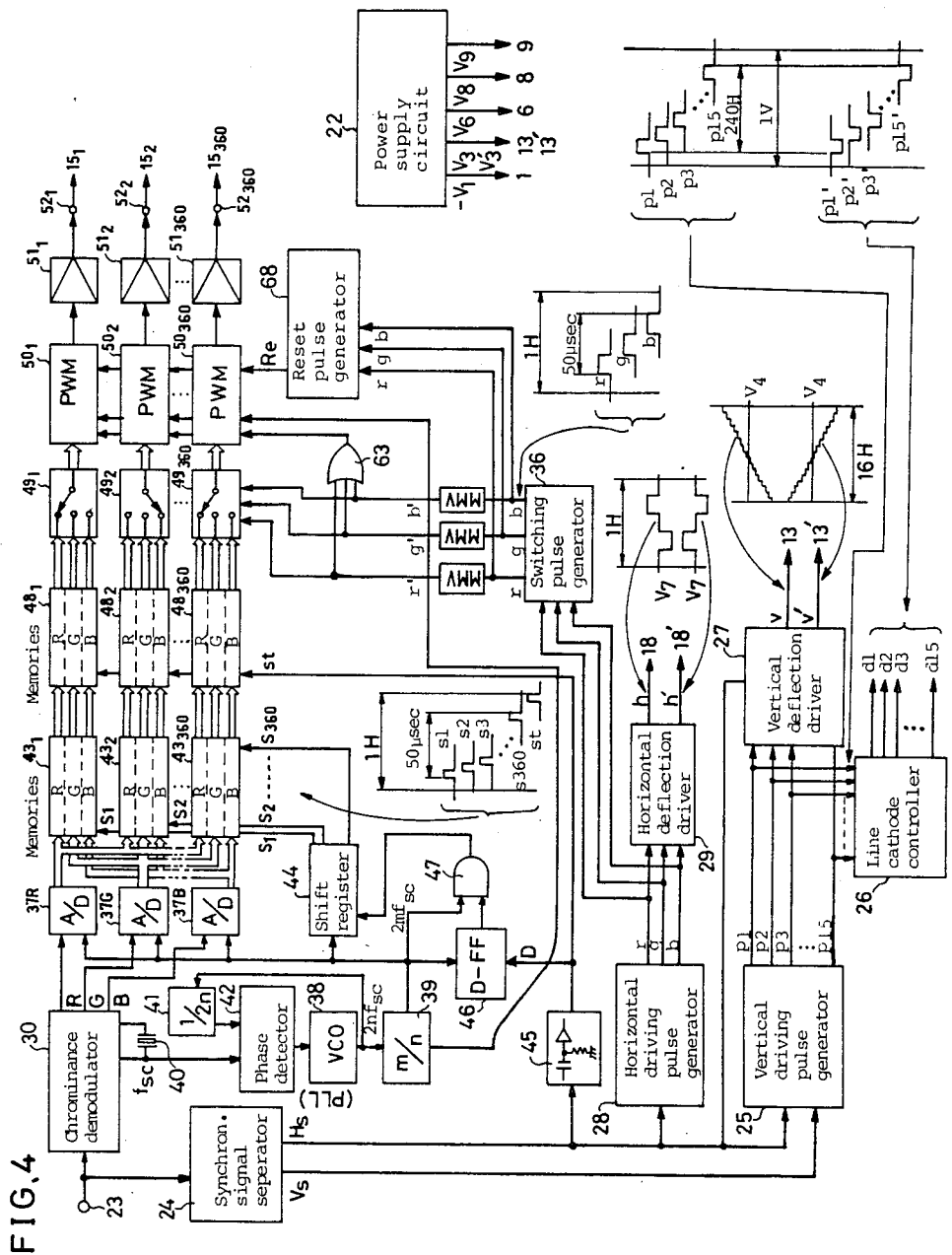
FIG. 4 is a fundamental circuit block diagram showing a preferred example of electric circuit embodying the present invention for operating the apparatus of FIGS. 1 and 2.

Circuit configuration for operating the image display apparatus shown in FIGS. 1 and 2 is shown in FIG. 4. The circuit of FIGS. 4 is identical to that of FIG. 3 in horizontal deflection circuit part, vertical deflection circuit part and line cathode driving part, but differs in signal demodulation part.

An input terminal 23 receives an ordinary composite video signal and gives it to a synchronizing signal separator 24 and to a chrominance demodulator 30. The synchronizing signal separator 24 separates and issues vertical synchronizing signal $V_s$ and horizontal synchronizing signal $H_s$. Configuration and respective connections of the input terminals and output terminals of the vertical driving pulse generator 25 and horizontal driving pulse generator 28 are substantially the same as those of FIG. 3.

However, in the construction shown in and elucidated referring to FIG. 4, the number of strip electrodes 18, 18'... of the horizontal electrodes are 360 for the 360 rod-shaped electron beams.

The circuit for beam intensity control is made as follows:

The input composite video signal received at the input terminal 23 is given to the chrominance demodulator 30 where primary color signals R, G and B are demodulated and G-Y is also produced by a known matrix circuit therein. The color decoded primary color signals R, G and B are input to A/D converters 37R, 37G and 37B. The A/D converters 37R, 37G and 37B may be of general purpose type, and that of 6-8 bit is used.

A feature of the present invention lies in the below-mentioned generation of clock signal.

Clock signal for operating the A/D converters 37R, 37G and 37B are fed from a voltage controlled oscillator 38 through a frequency divider 39. Frequency of the clock signal for the A/D converter is derived from a color sub-carrier oscillator 40 in the color decoding circuit 30, and is set to be a frequency of 2m-times-multiplication of the color sub-carrier $f_{sc}$, where "m" is a natural number. On the other hand, a frequency divider 41 divides frequency of output signal of the voltage controlled oscillator 38 into $\frac{1}{2}n$, where "n" is a natural number equal to or larger than "m". The output of the frequency divider 41 is compared with the output of the color sub-carrier by the phase detector 42. And output of the phase detector 42 is fed to the voltage controlled oscillator 38. And thereby, a phase locked loop (PLL circuit) oscillates with a frequency of $2nf_{sc}$ in synchronization with the color sub-carrier. Now, provided that $m=n=1$, then $2nf_{sc}=7.16$ MHz. Thus, the possible number of data sampling for effective video information within one horizontal scanning period becomes 360. Accordingly, the clock pulses are fed to the A/D converters 37R, 37G and 37B at a rate of 360 pulses within the effective horizontal scanning period (50 sec), and then at each time 6 bit digital primary color signals are issued.

Output digital primary color signals from the A/D converters 37R, 37G and 37B are led to and stored in memories R parts, memories G parts and memories B parts of 360 set memories $43_1, 43_2 \ldots 43_{360}$ which are for storing digital data for horizontal scanning lines 1, 2, ... . 360, respectively. Each unit memory part, for instance, memory R, memory G, or memory B in a memory part for one line such as $43_j$ is a simple data latch circuit to memorize 6 bits in parallel. Latching pulse $S_1, S_2 \ldots S_{360}$ are fed from a shift register 44 which serves as a sampling pulse generator. When $m=n=1$ as provided above, the shift register 44 is a 360 stage parallel output shift register, which is fed with clock signal of a frequency $mf_{sc}$ from the frequency divider 39. A start pulse of the shift register 44 is a pulse having a width of one clock pulse of the frequency $mf_{sc}$. This is produced by differentiating by a differentiation circuit 45 a rear edge of horizontal synchronization signal issued from the synchronization signal separator 24 and converted into longer pulses of an appropriate duty period by means of a D-flipflop 46 so as to continue until starting of an actual video information, and the pulses are input to an AND gate 47 together with a clock signal of the $mf_{sc}$ frequency from the frequency divider 39. In actual circuit, the wave shaping or prolonging of the pulse may be made by only passing one D-flipflop 46.

Output of the differential circuit 45 is also used as a signal to transfer the contents data of the memories $43_1, 43_2 \ldots 43_{360}$ into subsequent memories $48_1, 48_2, \ldots 48_{360}$ which are connected respectively from the former. The subsequent memories $48_1, 48_2 \ldots 48_{360}$ are read out by corresponding multiplexer selection circuits $49_1, 49_2 \ldots 49_{360}$ at a time within one horizontal fly back period to input the data to the corresponding PWM circuits $50_1, 50_2 \ldots 50_{360}$ by control of switching pulse r', g' and b' which are given from the switching pulse generator 36 through each one monomulti-vibrator.

Pulse width modulated signals for red, green and blue primary color signals from the PWM circuit $50_1, 50_2 \ldots 50_{360}$ are amplified by responding amplifiers $51_1, 51_2 \ldots 51_{360}$ ahd output from the output terminals $52_1, 52_2 \ldots 52_{360}$, and are given to the horizontal deflection electrodes $15_1, 15_2 \ldots$ of FIG. 1, respectively. The PWM circuits $50_1$, $50_2$ ... $50_{360}$ are controlled by clock pulses which are fed from the frequency divider 39. Circuit configuration of this apparatus can be simple since clock signal of $2mf_{sc}$ is fed from the same signal to be fed to the A/D converter 37R, 37G and 37B.

If a clock signal of a frequency of $2nf_{sc}$ is intended to be used for the PWM circuit, output signal of the voltage controlled oscillator 38 as such can be used only with some appropriate impedance conversion.

Instead of using the primary color output signal of the color decoder circuit 30 to be fed to the A/D converters 37R, 37G and 37B, it is possible to use a signal obtained by A/D conversion of composite video signal as such by using clock signal followed by digital decoding to obtain the same effect.

Since the outputs of the PWM circuits $50_1$, $50_2$ ... $50_{360}$ are generally of a logic level, which is very low, they are amplified by pulse amplifiers $51_1$, $51_2$ ... $51_{360}$ so that the output levels are agreeable to saturation levels and cut off levels of the control electrodes $15_1$, $15_2$ ..., so as to control the electron beams.

Actual circuit configuration of the memory circuit and their operations are elucidated with reference to FIG. 5 to FIG. 9. In the elucidation it is provided that A/D converters 37R, 37G and 37B are issuing 6 bit output signals.

Figure 5:
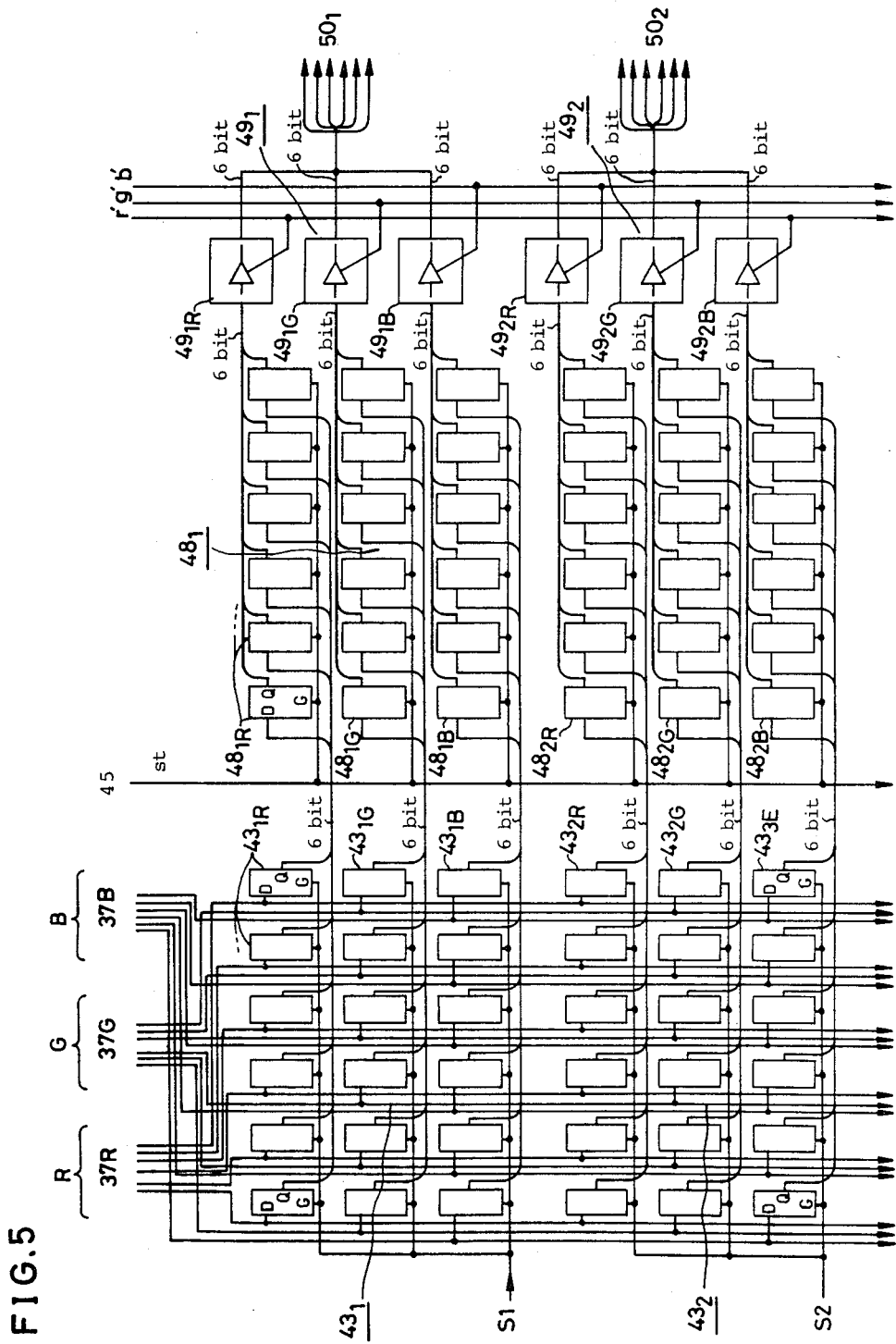
FIG. 5 is a circuit block diagram of memory part of the apparatus shown in FIG. 4.
Figure 6:
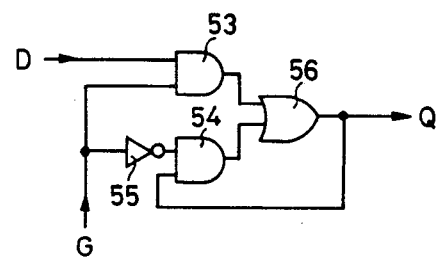
FIG. 6 is a circuit diagram of 1-bit part of the memory of FIG. 5.
Figure 7:
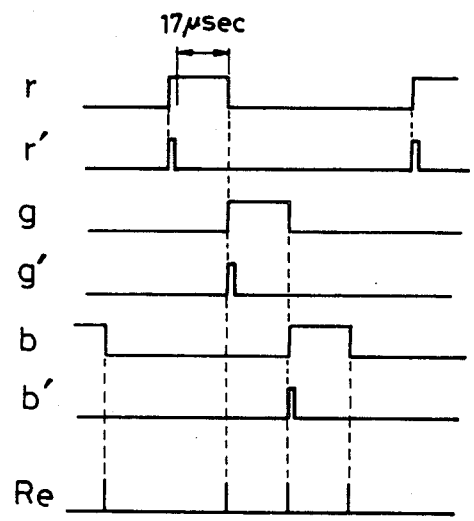
FIG. 7 is a timing chart showing waveforms of various parts of FIG. 6.

FIG. 5 shows an example of circuit of memories $43_1$, $43_2$ ... $43_{360}$, memories $48_1$, $48_2$ ... $48_{360}$ and switching circuits $49_1$, $49_2$ ... $49_{360}$. The memories $43_1$ to $43_{360}$ and $48_1$ to $48_{360}$ are constituted with data latch circuits $43_{1R}$, $43_{1G}$, $43_{1B}$, $43_{2R}$, $43_{2G}$, $43_{2B}$ ... $48_{1R}$, $48_{1G}$, $48_{1B}$, $48_{2R}$, $48_{2G}$, $48_{2B}$ ... for respective bits, and FIG. 6 shows an example of each unit memory. The circuit of FIG. 6 is formed with AND gates 53 and 54, inverter 55 and OR gate 56, wherein input signal at a data input terminal D is conveyed to output terminal Q only when a H data latch pulse is impressed on the gate terminal G, while at a negative edge of data latch pulse the input signal is latched thereby outputting memorized output signal to the output terminal Q.

Latch pulses s1, s2 ... s360 are output pulses of the shift register 44 and they are given to 360 memories in the memory set $43_1$ to $43_{360}$ one by one in sequence within one horizontal scanning period. Accordingly, the A/D converted digital primary color signals are memorized into 360 memories $43_1$, ... $43_{360}$ within one horizontal scanning period. The memory $43_1$ stores data for the leftest part picture element and memory $43_{360}$ stores data for the rightest picture element.

The stored data are present at the data latch output terminals Q of FIG. 6, and are given to the input terminals D of the next memories $48_1$ ... $48_{360}$. The memories $48_1$ ... $48_{360}$ are constituted with the same unit data latch circuit shown in FIG. 6 like the memories $43_1$ to $43_{360}$. The latch pulses of the memories $48_1$ to $48_{360}$ are data transfer pulses st, which is fed from the differential circuit 45 to all terminals of the memories $48_1$ to $48_{360}$. That is the stored data of the memories $43_1$ to $43_{360}$ are transferred by means of the data transfer pulse to the memories $48_1$ to $48_{360}$ are same time.

The switching circuit $49_{1R}$ or $49_{1G}$ or $49_{1B}$ or ... represents six switching circuits, but only one switching circuit $49_{1R}$, $49_{1G}$, $49_{1B}$, $49_{2R}$, $49_{2G}$ or $49_{2B}$, is drawn in FIG. 5 as the representative for 6 switching circuits respectively for 6 memories of $48_{1R}$ or $48_{1G}$ or .... That is, in actual apparatus, six switching circuits are connected to respective output terminals of the six memories of each row $48_{1R}$ or $48_{1G}$ or .... As the switching circuits, tristate buffer circuit can be used. The switching control signals r', g' and b' are given with timings shown in FIG. 7. These signals r', g' and b' are produced by extending the input time of the output pulses r, g and b of the switching pulse generator 36 by means of monomultivibrator MMV. Thereby, the switching circuits $49_1$, $49_2$ ... $49_{360}$ in sequence switches digital primary color signals R, G and B in that sequence, and the read out data are fed to the PWM circuit $50_1$, $50_2$ ... $50_{360}$ within duty times of each pulse of switching pulses r', g' and b'.

Figure 8:
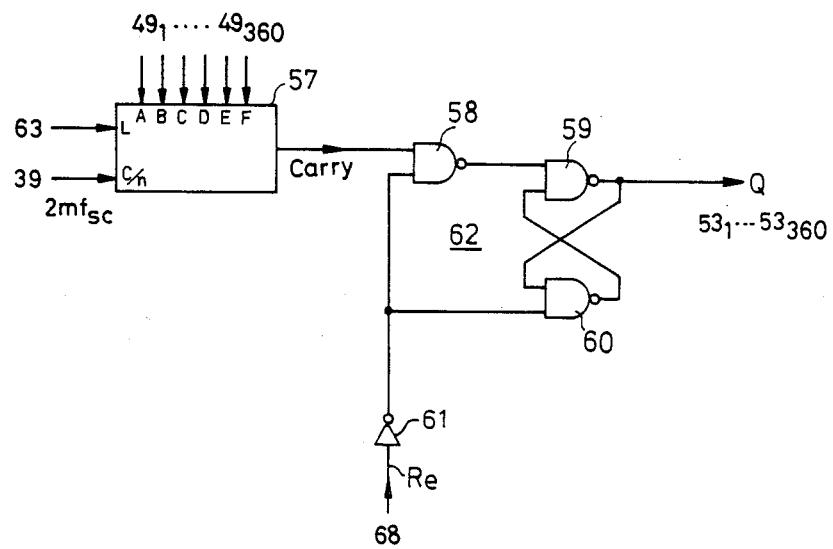
FIG. 8 is a circuit diagram of a PWM circuit to be used in the circuit of FIG. 4.
Figure 9:
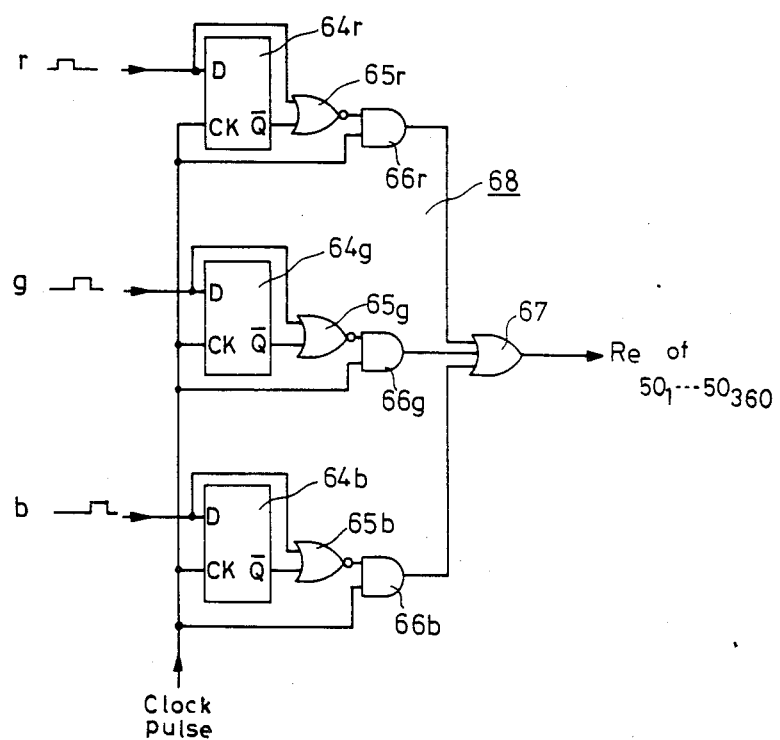
FIG. 9 is a circuit diagram of a reset pulse generator for generating reset pulses for the PWM circuit.

The PWM circuits $50_1$ to $50_{360}$ are each constituted as shown in FIG. 9 with 6 bit presettable counter 57 and a reset preference RS-flipflop 62 consisting of NAND gates 58, 59 and 60 and an inverter 61. Digital primary color signal data of each picture element selected by the switching circuit $49_1$, $49_2$ ... are given to the presettable counter 57 as preset data. At the same time, by impressing the switching pulses r', g' and b' through OR gate 63 of FIG. 4 on load terminal of the preset counter 57, digital primary color signals selected by the switching circuit $49_1$, $49_2$ ... are preset in the counter 57. Clock signal of frequency $f_{sc}$ from the color sub-carrier generator 39 is counted by the presettable counter 57, and the reset preference RS-flipflop 62 is set by the carrier output. Accordingly, the larger the primary color signal is, the shorter the time from the incoming of load pulse to the time of the setting comes. On the other hand, as shown in FIG. 8, reset pulse RE to be impressed to the inverter 61 is produced by a reset pulse generator 68, which comprises D-flipflop 64r, 64g, and 64b driven by the switching pulses r, g and b and clock pulse of $2mf_{sc}$ and NOR gates 65r, 65g and 65b, AND gates 66r, 66g and 66b, and OR gates 67; and the reset pulse RE resets the flipflop 62.

As a result, the PWM circuit of FIG. 8 issues output pulses which are pulse-width modulated responding to instantaneous signal level of three primary color signals within one horizontal scanning period of about 50 μsec in the order of digital red signal, digital green signal and digital blue signal; and the output digital primary color signals have rear edges fixed at time points of negative edges of the switching pulses r, g and b, and front edges of the digital primary color signals are shifted responding to the levels of the primary color signals from the switching circuits $49_1$, $49_2$ ... $49_{360}$. The maximum pulse width of the digital primary color signals are 16.6 μsec which is defined by $1/f_{sc}(sec) \times 64$ (bits).

In this way, the PWM circuits $50_1$ ... $50_{360}$ issue pulse width modulated primary color signals and these outputs are amplified by pulse amplifier $51_1$ ... $51_{360}$, respectively, to a desired level, so that the PWM signal can control the 360 electron beams by impressions on the control electrodes $15_1$ ... $15_{360}$. Thus a color picture is displayed on the phosphor screen.

In the above-mentioned example, the oscillation frequency of the voltage controlled oscillator 38 of the PLL circuit, which is synchronized to the color sub-carrier, is selected as $2n.f_{sc}$, and on the other hand as a signal to be impressed on the A/D converters 37R, 37G and 37B, and on shift register 44 for making data latch pulses a signal having frequency of $2m.f_{sc}$, which is obtained from the divider 39, is used; but in case the condition is selected to be n=m, then the frequency divider 39 can be removed.

Figure 10:
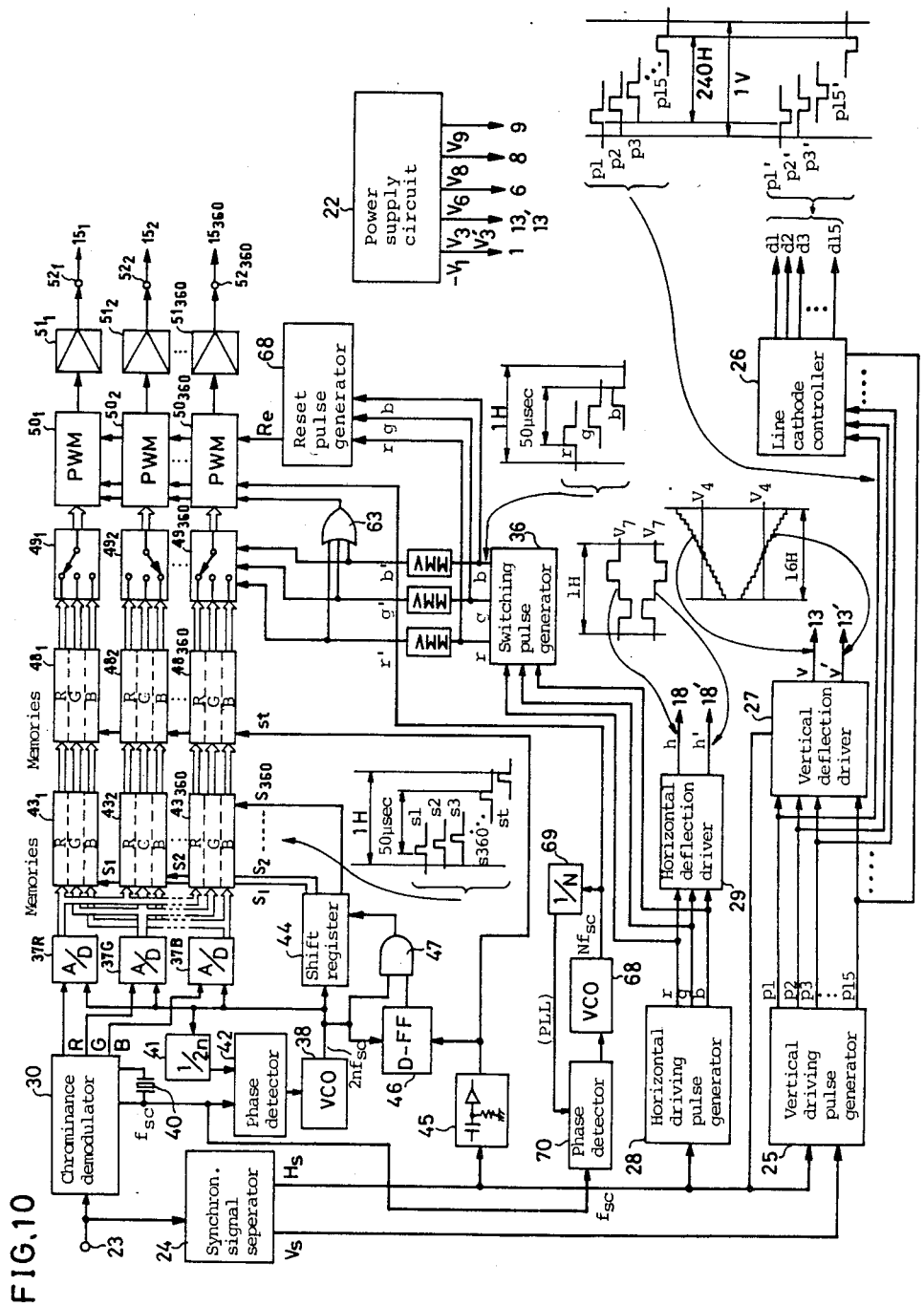
FIG. 10 is a fundamental circuit diagram showing another preferred example of electric circuit for the apparatus of FIG. 1 and FIG. 2.

FIG. 10 shows another example of the present invention. In this example, the PLL circuit consists of a voltage controlled oscillator 68, a frequency divider 69 which divides the frequency of the voltage controlled oscillator 68 into 1/N (where "N" is a natural integer), and a phase detection circuit 70 for phase-detecting the color sub-carrier signal $f_{sc}$ from the color sub-carrier oscillator 40 and the divided output to make the voltage controlled oscillator 68 oscillate in synchronism with the color sub-carrier signal $f_{sc}$ to produce an output of $N.f_{sc}$ Accordingly, the voltage controlled oscillator issues a clock pulse signal of the frequency $N.f_{sc}$ which has a frequency made by multiplying the $f_{sc}$ with natural integer "N" and is synchronized with the color sub-carrier, therewith PWM circuit $50_1 \ldots 50_{360}$ can be driven.

As has been elucidated referring to preferred embodiments, the present color image display apparatus in accordance with the present invention makes A/D conversion of chrominance signal of color television signal into digital color signals and store them in memory means and thereafter reading the stored data and makes a PWM signal which is made by pulse width modulating responding to the stored data, and a plural number of a electron beams corresponding to divided segments of phosphor screen are controlled with these PWM signal. Therefore, as a result of utilization of the digital color signal and PWM signal controlling of the electron beam, accurate reproduction of color images can be attainable.

Furthermore, by utilizing a signal of color sub-carrier frequency synchronized thereto, a very accurate clock signal suitable for the PWM circuit is obtainable only with simple PLL circuit. Accordingly, an accurate display of color image is attainable.

What is claimed is:

1. A color image display apparatus comprising:
   clock signal generator means for generating a clock signal having a frequency of an integer-times-mulitplication of a color sub-carrier of a color television signal, said clock signal being synchronized to said color sub-carrier,
   A/D conversion means for converting chrominance signals of said color television signal into digital chrominance signals by utilizing said clock signal,
   memory means for storing said digital chrominance signals until the end of a next horizontal scanning period,
   PWM means for converting said ditigal chrominance signals read out from said memory means into pulse-width modulated chrominance signals utilizing said clock signal, and
   color image display means for displaying a color image by utilizing said pulse-width modulated chrominance signals.

2. A color image display apparatus in accordance with claim 1, wherein:
   said clock signal generator means comprises a phase locked loop circuit which produces said clock signal used by said A/D conversion means and said PWM means by frequency-dividing a phased locked portion of said color signal.

3. A color image display apparatus in accordance with claim 1, wherein
   said chrominance signal consists of red, green and blue primary color signals and said digital chrominance signal consists of digital chrominance signals for red, green and blue primary colors,
   and said memory means comprises first memory means for storing said digital chrominance signals for red, green and blue primary colors until said next horizontal scanning period, second memory means for storing data of said first memory means and signal transporting data of said first memory means into said second memory means at the same time within a flyback period of horizontal scanning, data in said second memory means being pulse-width modulated by said PWM means within at least a part of a next flyback period of said horizontal scanning.

4. A color image display apparatus in accordance with claim 1, wherein
   said clock signal fed to said A/D conversion means is the same as that fed to said PWM means.

5. A color image display apparatus in accordance with claim 1, wherein
   said clock signal generator means generates a first clock signal which is produced by first-integer-times multiplication of the color sub-carrier to feed to said A/D conversion means and generates a second clock signal which is produced by second-integer-times multiplication of the color sub-carrier to feed to said PWM means.

* * * * *